United States Patent
Zhou

(10) Patent No.: US 12,372,178 B2
(45) Date of Patent: Jul. 29, 2025

(54) ADAPTER ASSEMBLY

(71) Applicant: Guangzhou Fengxue Technology Co., Ltd., Guangzhou (CN)

(72) Inventor: Hong Zhou, Guangzhou (CN)

(73) Assignee: Guangzhou Fengxue Technology Co., Ltd., Guangzhou (CN)

( * ) Notice: Subject to any disclaimer, the term of this patent is extended or adjusted under 35 U.S.C. 154(b) by 0 days.

(21) Appl. No.: 18/963,320

(22) Filed: Nov. 27, 2024

(65) Prior Publication Data
US 2025/0092973 A1 Mar. 20, 2025

Related U.S. Application Data

(63) Continuation of application No. 18/470,230, filed on Sep. 19, 2023.

(51) Int. Cl.
*F16L 27/10* (2006.01)
(52) U.S. Cl.
CPC .................. *F16L 27/1017* (2013.01)
(58) Field of Classification Search
CPC .................. F16L 27/1017; F16L 27/107
See application file for complete search history.

(56) References Cited

U.S. PATENT DOCUMENTS

| | | | | |
|---|---|---|---|---|
| 6,315,220 | B1* | 11/2001 | Grubb | F16L 37/48 |
| | | | | 4/615 |
| 7,350,824 | B2* | 4/2008 | Petner | E03C 1/304 |
| | | | | 285/8 |
| 10,393,300 | B1* | 8/2019 | Lane | F16L 11/00 |

* cited by examiner

*Primary Examiner* — James M Hewitt, II

(57) ABSTRACT

An adapter assembly relates to the technical field of adapter hoses. The adapter assembly includes a main pipeline and an adapter pipeline. The main pipeline configured to circulate gas or liquid. The adapter pipeline is provided with a near end and a far end opposite to the near end of the adapter pipeline. The near end of the adapter pipeline and the main pipeline are integrally formed. The far end of the adapter pipeline is configured to be connected to a liquid channel or a gas channel. After the adoption of the above technical solutions, an adapter pipeline is arranged on the main pipeline, and the other end of the adapter pipeline sleeves a liquid channel or gas channel. So that the main pipeline is not easily washed away by the water pressure or gas pressure, which can be applicable to gas channels or liquid channels in different shapes.

15 Claims, 6 Drawing Sheets

ADAPTER ASSEMBLY

CROSS-REFERENCE TO RELATED APPLICATIONS

This application is a Continuation of the U.S. application Ser. No. 18/470,230 filed on Sep. 19, 2023, and entitled "ADAPTER ASSEMBLY," the entire disclosures of which are incorporated herein by reference.

TECHNICAL FIELD

The present disclosure relates to the technical field of adapter hoses, and specifically, to an adapter assembly.

BACKGROUND

Main pipelines are widely circulated on the market, among which, the most common pipeline is arranged on a water faucet and a connection port of a vacuum cleaner in a sleeving manner, which can ensure that water from the water faucet flows out of an adapter pipeline safely and effectively and also cause the connection port of the vacuum cleaner to become longer, making it easier to clean garbage.

Most of the main pipelines on the market are directly arranged on liquid or gas channels in a sleeving manner. Without fixing devices, these main pipelines are easily washed away by water pressure or gas pressure during use, and often need to be remounted on the liquid or gas channels. It is inconvenient and unsafe to use. In addition, the main pipelines can only sleeve liquid or gas channels with fixed shapes, instead of liquid or gas channels with different shapes.

SUMMARY

The present disclosure aims to provide an adapter assembly for the drawbacks and shortcomings in the prior art. An adapter pipeline is arranged on the main pipeline, and the other end of the adapter pipeline sleeves a liquid channel or gas channel. An elastic resetting force generated when the adapter pipeline is stretched fixes the main pipeline to the liquid channel or gas channel. Furthermore, the adapter pipeline is a flexible pipeline, which can sleeve liquid channels or gas channels with different shapes.

The technical solution of the present disclosure is as follows: an adapter assembly including a main pipeline, configured to circulate gas or liquid; and an adapter pipeline, wherein the adapter pipeline is provided with a near end and a far end opposite to the near end of the adapter pipeline; the near end of the adapter pipeline and the main pipeline are integrally formed; and the far end of the adapter pipeline is configured to be connected to a liquid channel or a gas channel.

Preferably, the main pipeline includes an extended pipeline and a connection pipeline which are communicated to each other; the extended pipeline is provided with a first end and a second end opposite to the first end of the extended pipeline; an outlet is arranged at the first end of the extended pipeline; one end of the connection pipeline is connected to the second end of the extended pipeline; and the other end of the connection pipeline is integrally formed with the near end of the adapter pipeline.

Preferably, the second end of the extended pipeline is integrally formed with the connection pipeline.

Preferably, a material of the adapter pipeline is one of rubber, silica gel, or latex.

Preferably, a material of the main pipeline is different from the material of the adapter pipeline, and a flexibility of the adapter pipeline is greater than a flexibility of the main pipeline.

Preferably, the near end of the adapter pipeline is connected and fixed to the connection pipeline through secondary injection molding, hot melt bonding, or solvent bonding.

Preferably, a part of the connection pipeline is located in the adapter pipeline.

Preferably, an inlet is arranged at a tail end of the part, located in the adapter pipeline, of the connection pipeline, and the inlet is communicated with the liquid channel or the gas channel.

Preferably, a radius of the near end of the adapter pipeline is less than or equal to a radius of the connection pipeline.

Preferably, a radius of the far end of the adapter pipeline is less than a radius of the liquid channel or gas channel; when the adapter pipeline sleeves the liquid channel or gas channel, an elastic resetting force generated when the adapter pipeline is stretched causes an inner surface of the adapter pipeline to push and press against an outer surface of the liquid channel or gas channel, so that the inner surface of the adapter pipeline pushes and seals the outer surface of the liquid channel or gas channel.

Preferably, the second end of the extended pipeline is detachably connected to the connection pipeline.

Preferably, an inner diameter of the second end of the extended pipeline is less than an outer diameter of the connection pipeline or an outer diameter of the extended pipeline is greater than an inner diameter of the connection pipeline.

Preferably, a material of the adapter pipeline is one of rubber, silica gel, or latex.

Preferably, a material of the adapter pipeline is different from a material of the main pipeline, and a flexibility of the adapter pipeline is greater than a flexibility of the main pipeline.

Preferably, the near end of the adapter pipeline is connected and fixed to the connection pipeline through secondary injection molding, hot melt bonding, or solvent bonding.

Preferably, a part of the connection pipeline is located in the adapter pipeline.

Preferably, an inlet is arranged at a tail end of the connection pipeline located in the adapter pipeline, and the inlet is communicated with the liquid channel or the gas channel.

Preferably, a radius of the near end of the adapter pipeline is less than or equal to a radius of the connection pipeline.

Preferably, a radius of the far end of the adapter pipeline is less than a radius of the liquid channel or gas channel; when the adapter pipeline sleeves the liquid channel or gas channel, an elastic resetting force generated when the adapter pipeline is stretched causes an inner surface of the adapter pipeline to push and press against an outer surface of the liquid channel or gas channel, so that the inner surface of the adapter pipeline pushes and seals the outer surface of the liquid channel or gas channel.

Preferably, the part, located in the adapter pipeline, of the connection pipeline sleeves and is inserted into the liquid channel or gas channel.

After the adoption of the above technical solutions, the present disclosure has the beneficial effects: In the present disclosure, the adapter pipeline is fixed at one end of the connection pipeline; the radius of the adapter pipeline is less than the radius of the liquid channel or gas channel; and the far end of the adapter pipeline is stretched to sleeve the liquid channel or gas channel. Due to the high scalability of the adapter pipeline, the elastic resetting force generated when the adapter pipeline is stretched causes the inner surface of the adapter pipeline to push and press against the outer surface of the liquid channel or gas channel, so that the inner surface of the adapter pipeline pushes and seals the outer surface of the liquid channel or gas channel to make the fixing between the main pipeline and the liquid channel or gas channel more stable; the main pipeline is not easily washed away by the water pressure or gas pressure; gas leakage or water leakage hardly occurs in the main pipeline; furthermore, the adapter pipeline is a flexible material, which can be applicable to different types of gas channels or liquid channels in different shapes. The material of the adapter pipeline has certain viscosity on its surface, so that the main pipeline can be better prevented from being separated from the liquid channel or gas channel.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

DETAILED DESCRIPTION OF THE EMBODIMENTS

The present disclosure is further described below in detail in combination with the accompanying drawings and embodiments.

This specific embodiment is only an explanation of the present disclosure, and it is not a limitation to the present disclosure. After reading this specification, those skilled in the art can make modifications to this embodiment that do not create any contribution as needed, but the modifications shall be protected by the patent law within the scope of the claims of the present disclosure.

Embodiment I

Figure 1:
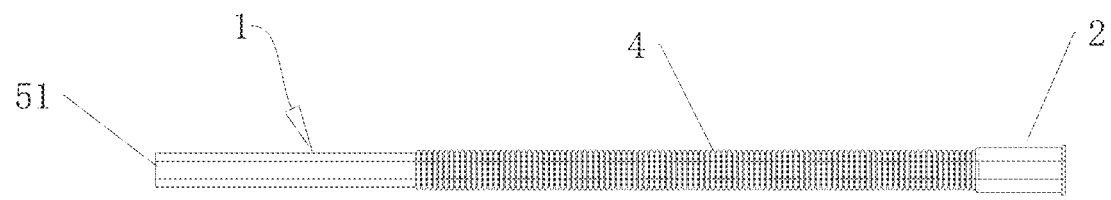
FIG. 1 is an overall schematic diagram of Embodiment I of the present disclosure.
Figure 2:
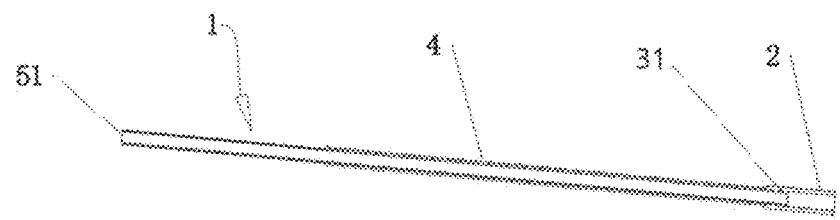
FIG. 2 is a sectional view of Embodiment I of the present disclosure.
Figure 3:
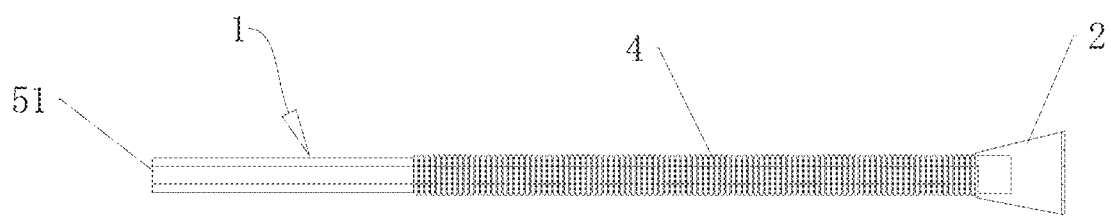
FIG. 3 is an exploded diagram of highlighting a relationship between an adapter pipeline and a connection pipeline in Embodiment I of the present disclosure.
Figure 4:
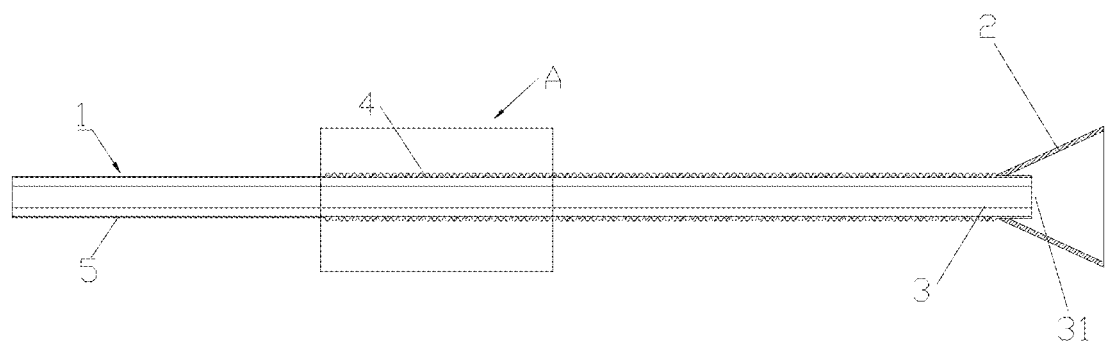
FIG. 4 is a sectional view corresponding to FIG. 3 of the present disclosure.
Figure 9:
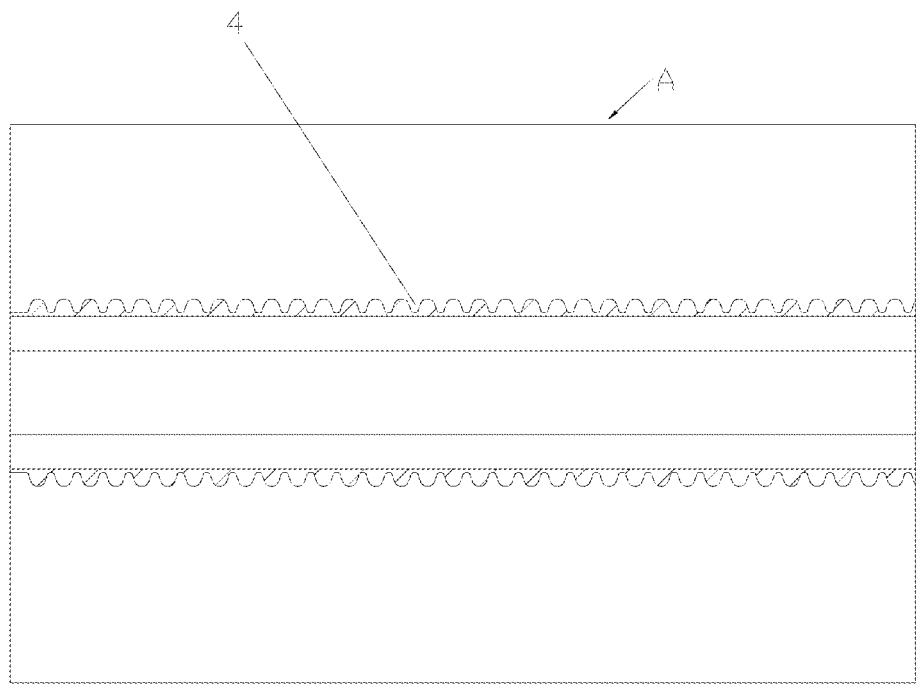
FIG. 9 is an enlarge view of the part A of FIG. 4, and FIG. 10 and FIG. 11 are schematic views of the adapter assembly of Embodiment I during using states.
Figure 10:
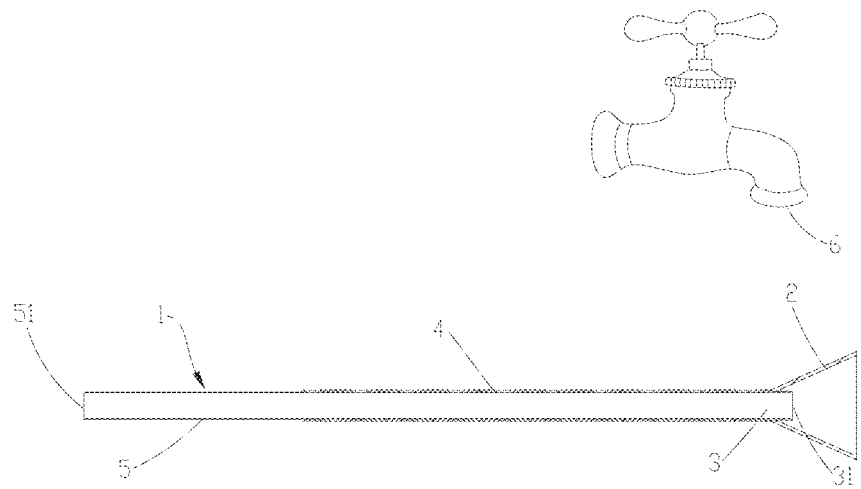
FIG. 10 shows liquid channel gas channel adapted for the adapter assembly.
Figure 11:
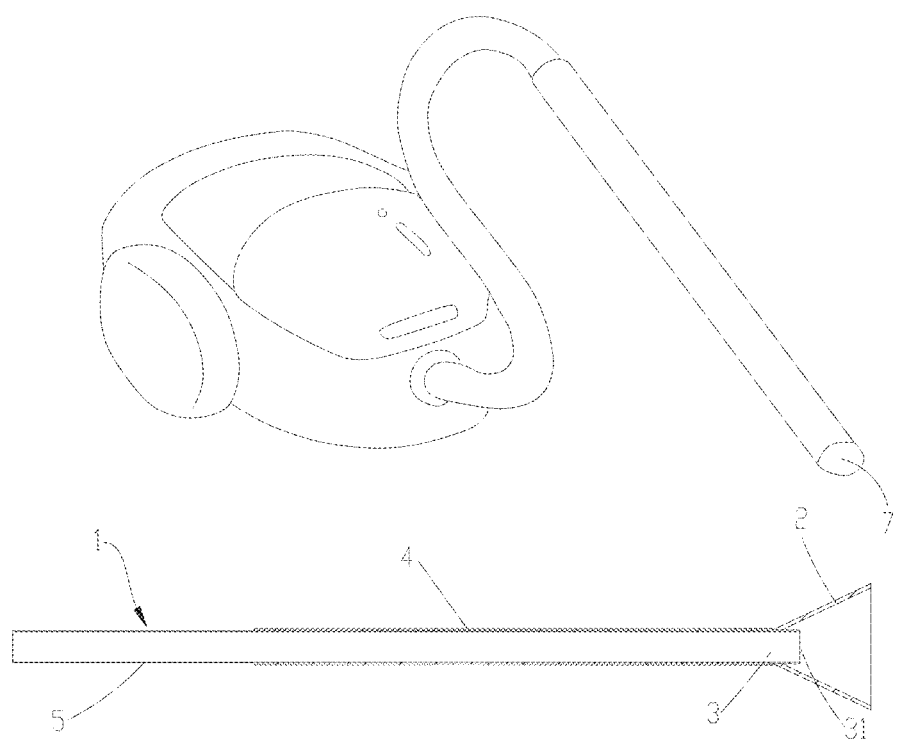
FIG. 11 shows gas channel adapted for the adapter assembly.

Referring to FIGS. 1-4 and 9-11, this embodiment relates to an adapter assembly, including a main pipeline 1 and an adapter pipeline 2.

The main pipeline 1 is configured to circulate gas or liquid. The main pipeline itself has a certain degree of scalability and is soft. The main pipeline 1 includes an extended pipeline 5 and a connection pipeline 3. The extended pipeline 5 and the connection pipelines 3 are made of the same material and are both flexible.

The extended pipeline 5 is provided with a first end and a second end opposite to the extended pipeline 5. An outlet 51 is arranged at a tail end of the first end of the extended pipeline 5, and gas or liquid is discharged from the outlet 51. The second end of the extended pipeline 5 is integrally formed with one end of the connection pipeline 3.

The adapter pipeline 2 is provided with a near end and a far end opposite to the near end. The near end of the adapter pipeline 2 is integrally formed with the other end of the connection pipeline 3, and the far end of the adapter pipeline 2 is configured to be in sleeving connection with a liquid channel 6 or gas channel 7 in a sleeving manner.

In this embodiment, a material of the adapter pipeline 2 is rubber. In other embodiments, a material of the adapter pipeline 2 can be any of silica gel, latex, or another elastic material.

In this embodiment, the material of the adapter pipeline 2 is different from a material of main pipeline 1. A flexibility of the adapter pipeline 2 is greater than a flexibility of the main pipeline 1. Then, the near end of adapter pipeline 2 is connected and fixed to the connection pipeline 3 through secondary injection molding, hot melt bonding, or solvent bonding. In other embodiments, the near end of the adapter pipeline 2 can also be connected and fixed to the connection pipeline 3 in a way such as ultrasonic welding, hot plate fusion, or hot gas welding.

As the adapter pipeline 2 is made of a soft rubber material and has elastic and stretchable characteristics, a shape of the adapter pipeline 2 can change according to shapes of different main pipelines 1 when the adapter pipeline 2 is fixed to the main pipeline 1. In this embodiment, due to the flat shape of the main pipeline 1, when the adapter pipeline 2 is fixed on an outer surface of the main pipeline 1, the adapter pipeline 2 also becomes flat in shape. In other embodiments, if the main pipeline 1 can be round, square, or in another shape, the adapter pipeline 2 corresponds to be round, square, or in another shape.

A radius of the adapter pipeline 2 is less than or equal to a radius of the main pipeline 1. When an inner wall of the adapter pipeline 2 sleeves the outer surface of the main pipeline 1, due to the elasticity of the material of the adapter pipeline 2, an elastic resetting force generated when the adapter pipeline 2 is stretched causes an inner surface of the adapter pipeline 2 to push and press against an outer surface of the connection pipeline 3, so that the inner surface of the adapter pipeline 2 pushes and seals the outer surface of the connection pipeline 3. A part of the connection pipeline 3 is located in the adapter pipeline 2. An inlet 31 is arranged at a tail end of the part, located in the adapter pipeline 2, of the connection pipeline 3, and the inlet 31 is configured to be in sleeving connection with the gas channel or gas channel. The inlet 31 is also located inside the adapter pipeline 2. The part, located in the adapter pipeline 2, of the connection pipeline 3 sleeves and is inserted into the liquid channel or gas channel. In this way, in order to reserve a mounting travel space for the sleeving connection between the inlet 31 and the liquid channel or gas channel, during sleeving connection, the main pipeline 1 can completely enter or sleeve the liquid channel or gas channel to prevent collapse inside the adapter pipeline 2. If no mounting travel space is reserved between the main pipeline 1 and the adapter pipeline 2, the main pipeline 1 cannot sleeve the liquid channel or gas channel, so that hollows may be formed between the main pipeline 1 and both a water outlet and a gas outlet, causing collapse in the adapter pipeline 2. As a result, the adapter pipeline is easily washed away by gas pressure or water pressure, and connection between the main pipeline 1 and the liquid channel or gas channel is unstable. A radius of the far end of the adapter pipeline 2 is less than a radius of the liquid channel or gas channel. When the adapter pipeline 2 sleeves the liquid channel or gas channel, the elastic resetting force generated when the adapter pipeline 2 is stretched causes the inner surface of the adapter pipeline 2 to push and press against an outer surface of the liquid channel or gas channel, so that the inner surface of the adapter pipeline 2 pushes and seals the outer surface of the liquid channel or gas channel, and the connection between the main pipeline 1 and the liquid channel or gas channel is more stable, to prevent the main pipeline 1 from being washed away by the gas pressure or water pressure.

Due to the scalability of the adapter pipeline 2, the far end of the adapter pipeline 2 can sleeve liquid channels or gas channels in different sizes, which is simple and convenient.

A ripple 4 is arranged between the outlet of the main pipeline 1 and the inlet 31. The ripple 4 is convenient for a user to bend the main pipeline 1. The ripple 4 may includes a saw-toothed or wave structure extending from a length direction of the main pipeline 1, such that the main pipeline 1 is able to get longer and bend when an external force provided to the main pipeline 1 along the length direction of the main pipeline 1.

Embodiment II

Figure 5:
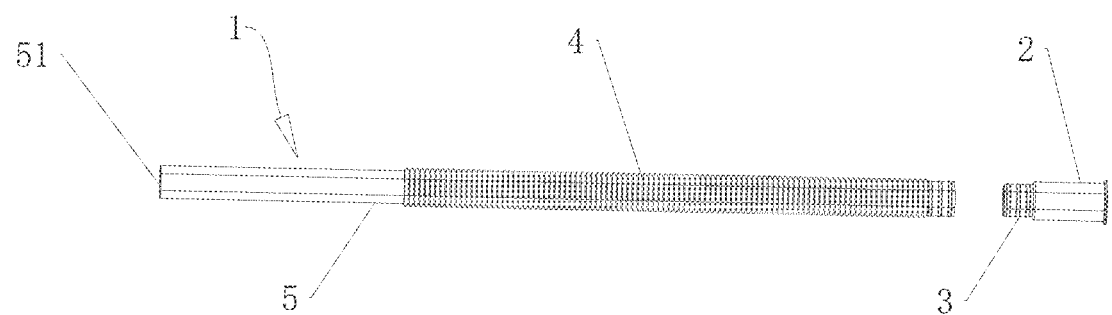
FIG. 5 is an overall schematic diagram of Embodiment II of the present disclosure.
Figure 6:
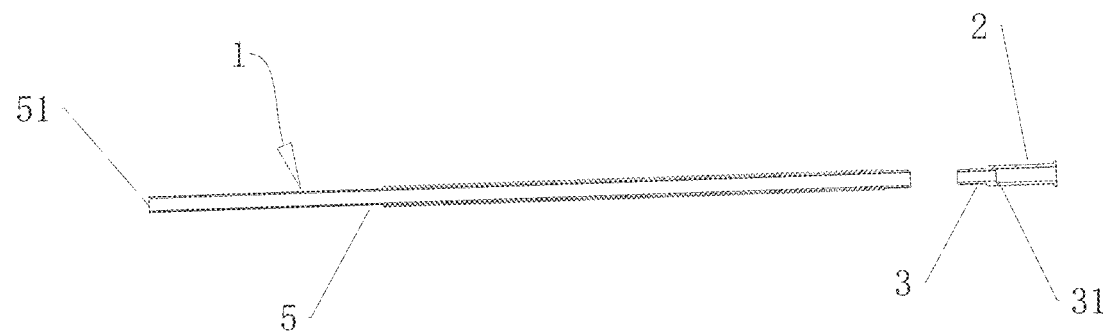
FIG. 6 is a sectional view corresponding to FIG. 5 of the present disclosure.
Figure 7:
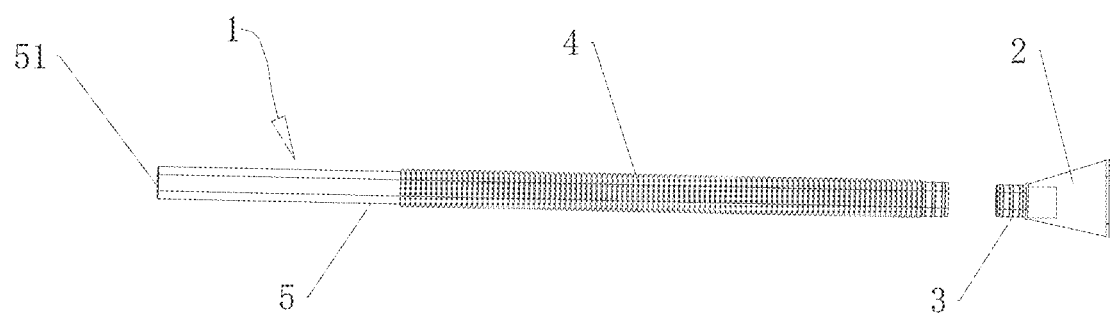
FIG. 7 is a schematic diagram of another view of Embodiment II of the present disclosure.
Figure 8:
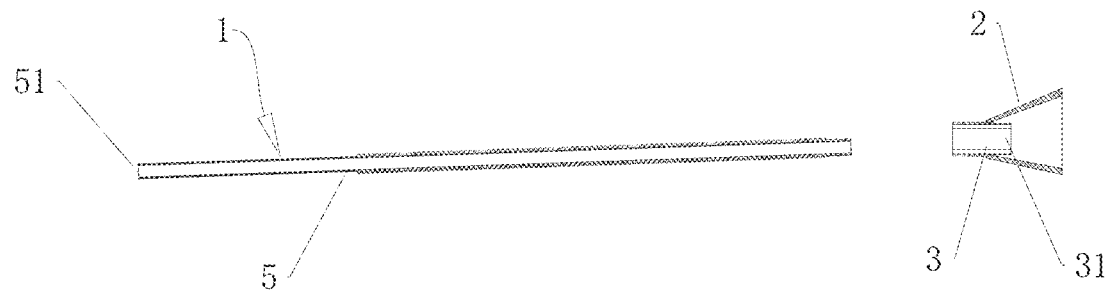
FIG. 8 is a sectional view corresponding to FIG. 7 of the present disclosure.

Referring to FIGS. 5-8, this embodiment relates to an adapter assembly. A difference between this embodiment and Embodiment I is that the second end of the extended pipeline 5 is connected to the connection pipeline 3 in a different way.

In this embodiment, the second end of the extended pipeline 5 is detachably connected to the connection pipeline 3. An inner diameter of the second end of the extended pipeline 5 is less than an outer diameter of the connection pipeline 3 or an outer diameter of the extended pipeline 5 is greater than an inner diameter of the connection pipeline 3. The second end of the extended pipeline 5 and one end of the connection pipeline 3 are in plugging fit to achieve detachable connection.

The above is only the preferred embodiments of the present disclosure, and is not intended to limit the present disclosure. Any modifications, equivalent replacements and improvements that are made within the spirit and principle of the present disclosure shall fall within the protection scope of the present disclosure.

What is claimed is:

1. An adapter assembly, comprising:
   an extended pipeline, configured to circulate gas or liquid;
   an adapter pipeline; and
   a connection pipeline located between the extended pipeline and the adapter pipeline;
   wherein the adapter pipeline is provided with a near end and a far end opposite to the near end, the far end of the adapter pipeline is configured to be detachably connected to a liquid channel or a gas channel, the near end of the adapter pipeline is integrally formed with one end of the connection pipeline with an inlet of the connection pipeline located in the adapter pipeline, and the connection pipeline is detachably connected to and in communication with the extended pipeline, and the connection pipeline and the extended pipeline form a sealing connection, thereby avoiding a leakage of gas or liquid.

2. The adapter assembly according to claim 1, wherein the near end of the adapter pipeline is integrally formed with one end of the connection pipeline through a method selected from one of the group consisting of secondary injection molding, hot melt bonding, or solvent bonding.

3. The adapter assembly according to claim 1, wherein the extended pipeline and the connection pipeline are made of the same material, and a length of the extended pipeline is greater than a length of the connection pipeline.

4. The adapter assembly according to claim 3, wherein the extended pipeline and the connection pipeline are made of a first flexible material, the adapter pipeline is made of a second flexible material, and a flexibility of the second flexible material is greater than a flexibility of the first flexible material.

5. The adapter assembly according to claim 1, wherein a material of the adapter pipeline is selected from one of the group consisting of rubber, silica gel, or latex.

6. The adapter assembly according to claim 1, wherein a radius of the far end of the adapter pipeline is less than a radius of the liquid channel or the gas channel, when the adapter pipeline sleeves the liquid channel or the gas channel, an elastic resetting force generated when the adapter pipeline is stretched causes an inner surface of the adapter pipeline to push and press against an outer surface of the liquid channel or the gas channel, so that the inner surface of the adapter pipeline pushes and seals the outer surface of the liquid channel or the gas channel.

7. The adapter assembly according to claim 1, wherein the extended pipeline is provided with a first end and a second end opposite to the first end, an outlet is arranged at the first end, one end of the connection pipeline is connected to the second end, and the other end of the connection pipeline is integrally formed with the near end of the adapter pipeline.

8. The adapter assembly according to claim 7, wherein an inner diameter of the second end of the extended pipeline is less than an outer diameter of the connection pipeline or an outer diameter of the extended pipeline is greater than an inner diameter of the connection pipeline.

9. The adapter assembly according to claim 1, wherein a ripple is arranged between an outlet of the extended pipeline and an inlet of the extended pipeline, and the ripple is configured to bend the extended pipeline conveniently.

10. The adapter assembly according to claim 1, wherein a part of the connection pipeline is located in the adapter pipeline.

11. The adapter assembly according to claim 10, wherein the inlet is arranged at a tail end of a part of the connection pipeline located in the adapter pipeline, and the inlet is configured to be communicated with the liquid channel or the gas channel.

12. The adapter assembly according to claim 1, wherein a radius of the near end of the adapter pipeline is less than or equal to a radius of the connection pipeline.

13. The adapter assembly according to claim 1, wherein the radius of the near end of the adapter pipeline is less than or equal to the radius of the connection pipeline, when the adapter pipeline sleeves the connection pipeline, an elastic resetting force generated when the adapter pipeline is stretched causes an inner surface of the adapter pipeline to push and press against an outer surface of the connection pipeline, so that the inner surface of the adapter pipeline pushes and seals the connection pipeline.

14. The adapter assembly according to claim 11, wherein an inlet arranged at the part of the connection pipeline located in the adapter pipeline is sleeved and inserted into the liquid channel or the gas channel.

15. An adapter assembly, comprising:
- a main pipeline, configured to circulate gas or liquid; and
- an adapter pipeline;
- wherein the adapter pipeline is provided with a near end and a far end opposite to the near end, the far end of the adapter pipeline is configured to be detachably connected to a liquid channel or a gas channel, the near end of the adapter pipeline is integrally formed with one end of the main pipeline, and the main pipeline comprises an inlet located in the adapter pipeline, and the inlet is configured to be communicated with the liquid channel or the gas channel; and
- wherein the main pipeline are made of a first flexible material, the adapter pipeline is made of a second flexible material, and a flexibility of the second flexible material is greater than a flexibility of the first flexible material.

* * * * *